US009975233B2

(12) United States Patent
Powell

(10) Patent No.: US 9,975,233 B2
(45) Date of Patent: May 22, 2018

(54) POWER TOOL INCLUDING AN ACCESSORY

(71) Applicant: Nanjing Chervon Industry Co., Ltd., Nanjing (CN)

(72) Inventor: Dennis W. Powell, Elk Grove Village, IL (US)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 553 days.

(21) Appl. No.: 13/691,432

(22) Filed: Nov. 30, 2012

(65) Prior Publication Data
US 2014/0150269 A1   Jun. 5, 2014

(51) Int. Cl.
*B25F 1/00* (2006.01)
*B23D 47/00* (2006.01)
*B25F 5/02* (2006.01)
*B25G 1/08* (2006.01)
*B27B 5/32* (2006.01)

(52) U.S. Cl.
CPC ............... *B25F 1/00* (2013.01); *B23D 47/00* (2013.01); *B25F 5/021* (2013.01); *B25F 5/029* (2013.01); *B25G 1/085* (2013.01); *B27B 5/32* (2013.01)

(58) Field of Classification Search
CPC . B25G 1/085; B25F 1/00; B25F 5/029; B25F 5/027; B25F 5/021; B27B 5/30; B27B 5/32; B26D 7/2621; B23D 47/00
USPC ......... 7/138, 169, 167; 81/184; 30/123, 142, 30/514
See application file for complete search history.

(56) References Cited

U.S. PATENT DOCUMENTS

| | | | |
|---|---|---|---|
| 706,242 A * | 8/1902 | Latshaw ............... | G01B 3/004 33/494 |
| 3,204,907 A | 9/1965 | Tattrie | |
| D318,435 S * | 7/1991 | Cutler ............................. | D10/71 |
| 5,070,562 A * | 12/1991 | Lentino ..................... | B25F 1/00 33/481 |
| 5,174,349 A | 12/1992 | Svetlik et al. | |
| 5,617,766 A * | 4/1997 | Tsuji ................... | B25B 23/1427 81/177.2 |
| 5,778,747 A * | 7/1998 | Chen .................... | B23D 45/044 30/388 |
| 6,739,224 B1 * | 5/2004 | Wershe ................. | B25G 1/085 7/138 |
| D684,875 S * | 6/2013 | Cook ............................. | D10/71 |
| 8,713,735 B1 * | 5/2014 | Pelton .................. | B26B 11/006 7/138 |
| 2009/0008282 A1 * | 1/2009 | Wasielewski ............. | B25F 5/02 206/376 |

(Continued)

*Primary Examiner* — Stephen Choi
*Assistant Examiner* — Evan MacFarlane
(74) *Attorney, Agent, or Firm* — Greenberg Traurig LLP

(57) ABSTRACT

A power tool includes a motor, a foot plate, a detent system, and an accessory. The motor is configured to move a saw blade in a repeating pattern of movement. The foot plate defines a saw blade opening and includes a guide surface that defines a storage space. The detent system is supported by the foot plate and has a detent member. The accessory defines (i) a first detent structure configured to receive the detent member therein, and (ii) a second detent structure configured to receive the detent member therein. The accessory is positionable between (i) a use position in which the accessory is spaced apart from the foot plate, and (ii) a storage position in which the accessory is located in the storage space.

15 Claims, 15 Drawing Sheets

(56) References Cited

U.S. PATENT DOCUMENTS

2011/0219596 A1* 9/2011 Oymaian ............... B23D 63/18
29/426.5

\* cited by examiner

US 9,975,233 B2

POWER TOOL INCLUDING AN ACCESSORY

FIELD

This disclosure relates to power tools and in particular to a power tool including an onboard accessory tool.

BACKGROUND

Power tools typically include fasteners, connecting members, and other types of adjustable features. One or more hand tools are typically used to configure the adjustable features. For example, a circular saw includes an arbor for connecting a saw blade to the circular saw and includes a fastener for maintaining the angular position of a foot plate of the circular saw. Typically, a different hand tool is used to adjust the arbor and the foot plate fastener.

In order to reduce the number of hand tools, referred to herein as accessories, that are used to adjust the power tool, it is desirable to combine two or more hand tools into a single accessory.

SUMMARY

In one embodiment of the disclosure, a power tool includes a motor, a foot plate, a detent system, and an accessory. The motor is configured to move a saw blade in a repeating pattern of movement. The foot plate defines a saw blade opening and includes a guide surface that defines a storage space. The detent system is supported by the foot plate and has a detent member. The accessory defines (i) a first detent structure configured to receive the detent member therein, and (ii) a second detent structure configured to receive the detent member therein. The accessory is positionable between (i) a use position in which the accessory is spaced apart from the foot plate, and (ii) a storage position in which the accessory is located in the storage space. During movement of the accessory from the use position to the storage position, the detent member is advanced (i) into the first detent structure, (ii) out of the first detent structure, and then (iii) into the second detent structure. During movement of the accessory from the storage position to the use position, the detent member is advanced (i) out of the second detent structure, (ii) into the first detent structure, and then (ii) out of the first detent structure.

In another embodiment of the disclosure, an accessory for a power tool, includes a top surface, a bottom surface, a first lateral side interposed between the top plate surface and the bottom plate surface, and a second lateral side interposed between the top plate surface and the bottom plate surface. The first lateral side defines a first detent structure and a second detent structure that are linearly aligned with one another. The accessory includes a wrench structure that has at least a first polygonal drive surface that extends between the top surface and the bottom surface.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
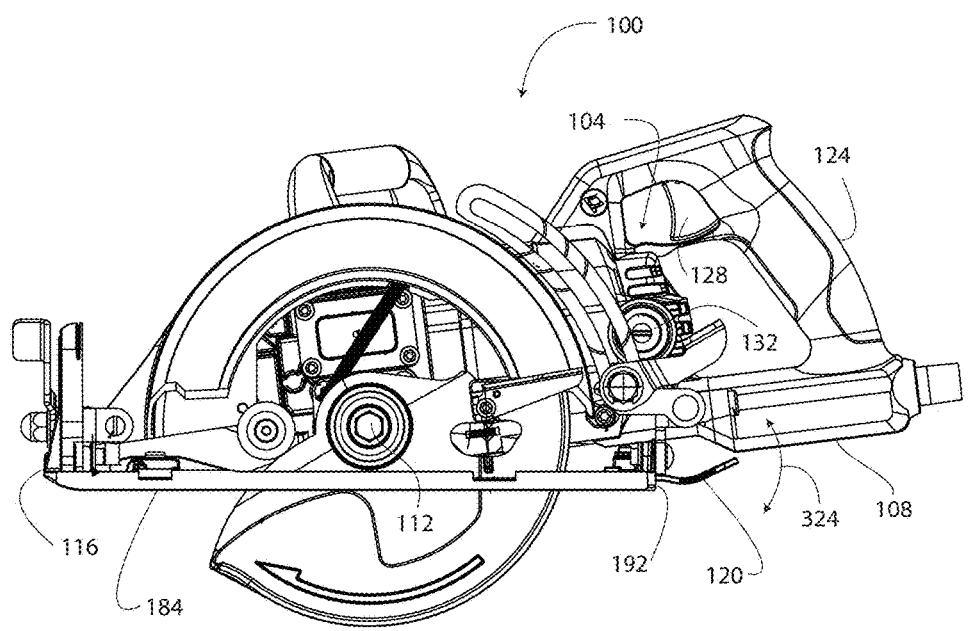
FIG. 1 is a side elevational view of a power tool and an accessory as described herein, with the accessory positioned in a storage space of the power tool.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

As shown in FIG. 1, a power tool 100 is shown as a worm drive circular saw. The power tool 100 includes a motor 104, a housing 108, an arbor 112, a foot plate 116, and an accessory 120. The motor 104 is at least partially enclosed in the housing 108. The motor 104 is one of a brushed electric motor and a brushless DC motor, and is supplied with electrical energy from an external power source. Alternatively, the motor 104 is supplied with electrical energy from an on-board battery or battery pack (not shown).

The housing 108 includes a grip portion 124, a switch 128, and a brush cap 132. The grip portion 124 is gripped by a user when moving the power tool 100 through a workpiece (not shown).

The switch 128 is movable between an energized positioned and a de-energized position. When the switch 128 is in the energized position, the motor 104 is supplied with electrical energy, and when the switch is in the de-energized position the motor 104 is disconnected/isolated from electrical energy.

The brush cap 132 is threaded into the housing 108 and covers a brush (not shown) of the motor 104. When the motor 104 is a brushless DC motor, the power tool 100 does not include the brush caps 132.

The arbor 112 is a diamond type of arbor, which is used to connect a saw blade 136 (FIG. 8) to the power tool 100. Diamond arbors, such as the arbor 112, are suitable for transmitting a high level of torque to the saw blade 136. When the arbor 112 connects the saw blade 136 to the power tool 100, and the motor 104 is supplied with electrical energy, the saw blade is moved in a repeating pattern of movement; that is, the saw blade is rotated relative to the housing 108.

The foot plate 116 is connected to the housing 108 of the power tool 100. The foot plate 116 is movable relative to the housing 108 to adjust the depth and angle of cut that the saw blade 136 makes in the workpiece. The foot plate 116 is formed from aluminum. In another embodiment, the foot plate 116 is formed from steel or magnesium.

Figure 2:
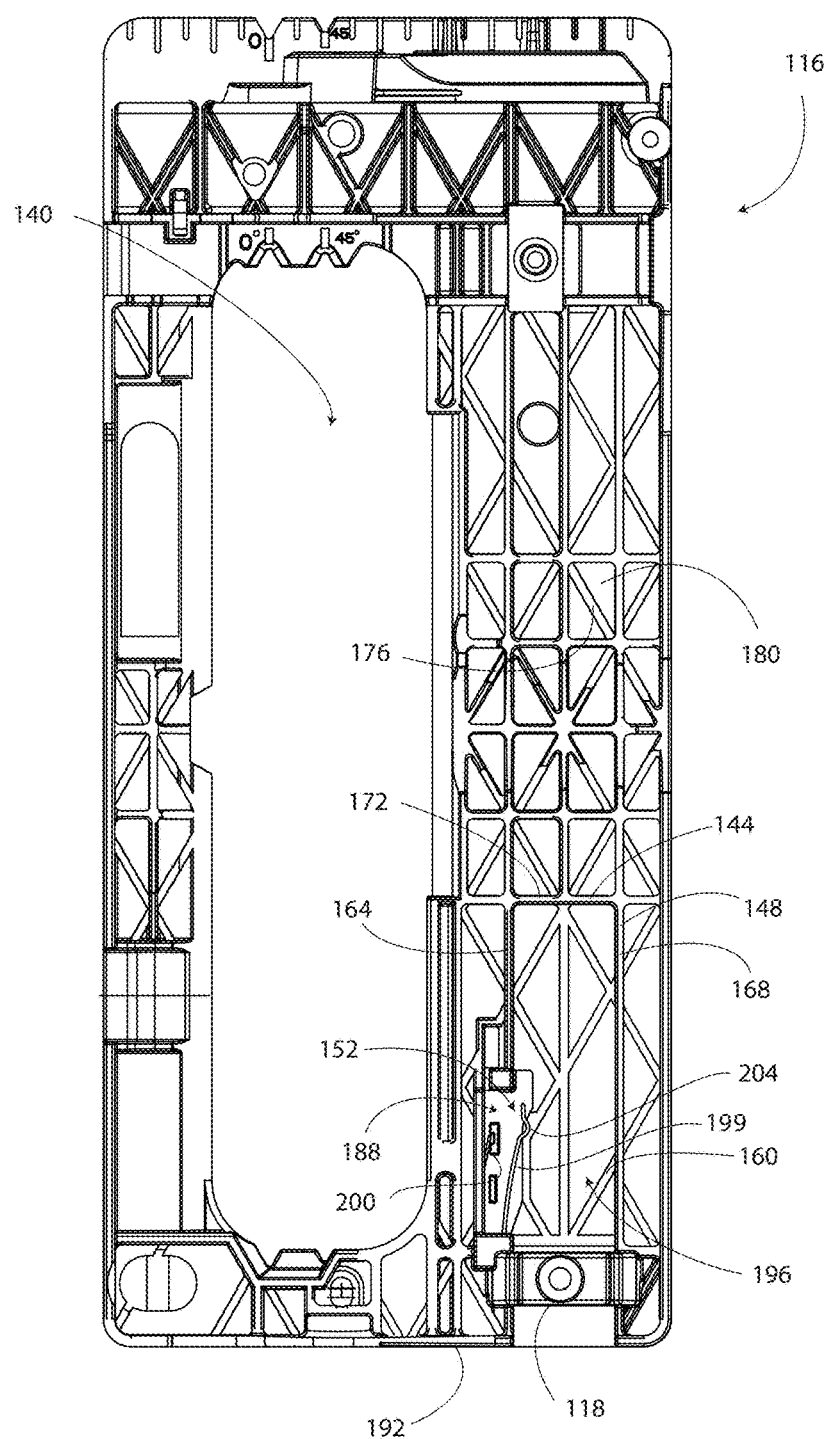
FIG. 2 is a top plan view of a foot plate of the power tool of FIG. 1, with the foot plate defining the storage space and including a detent system.

As shown in FIG. 2, the foot plate 116 defines a saw blade opening 140 and includes a storage structure 144. When the arbor 112 connects the saw blade 136 to the power tool 100, a portion of the saw blade extends through the saw blade opening 140.

The storage structure 144 includes a guide surface 148 and a detent system 152. The guide surface 148 includes a plurality of walls including a floor 160, a left lateral wall 164, a right lateral wall 168, and a backstop 172. The floor 160 is at least partially defined by ribs 176, which extend from a base 180 of the foot plate 116. The floor 160 is approximately parallel to, and opposite of, a workpiece contact surface 184 (FIG. 1) of the foot plate 116.

The left lateral wall 164 defines a biasing opening 188. The left lateral wall 164 extends from the backstop 172 to the biasing opening 188. The left lateral wall 164 also extends from the biasing opening 188 to an edge 192 of the foot plate 116.

The right lateral wall 168 is spaced apart from the left lateral wall 164 and extends from the backstop 172 to the edge 192. The right lateral wall 168 is approximately parallel to the left lateral wall 164. Both lateral walls 164, 168 are approximately perpendicular to the floor 160.

The backstop 172 extends between the left lateral wall 164 and the right lateral wall 168. The backstop 172 is approximately perpendicular to the floor 160 and to the lateral walls 164, 168.

Figure 4A:
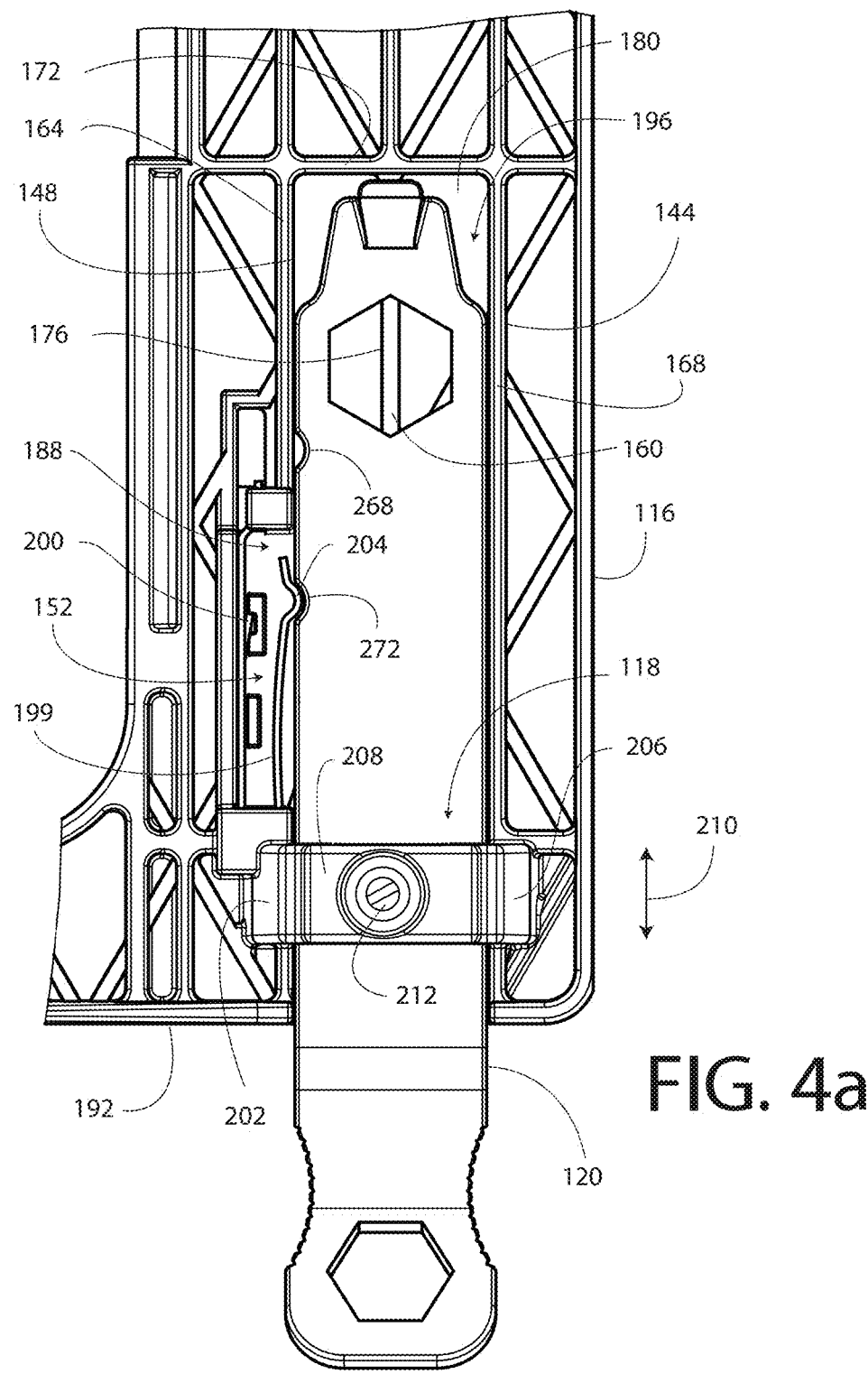
FIG. 4a is a fragmentary top plan view of the foot plate and the accessory with the accessory positioned in the storage space and below a bridge structure of the foot plate.
Figure 4B:
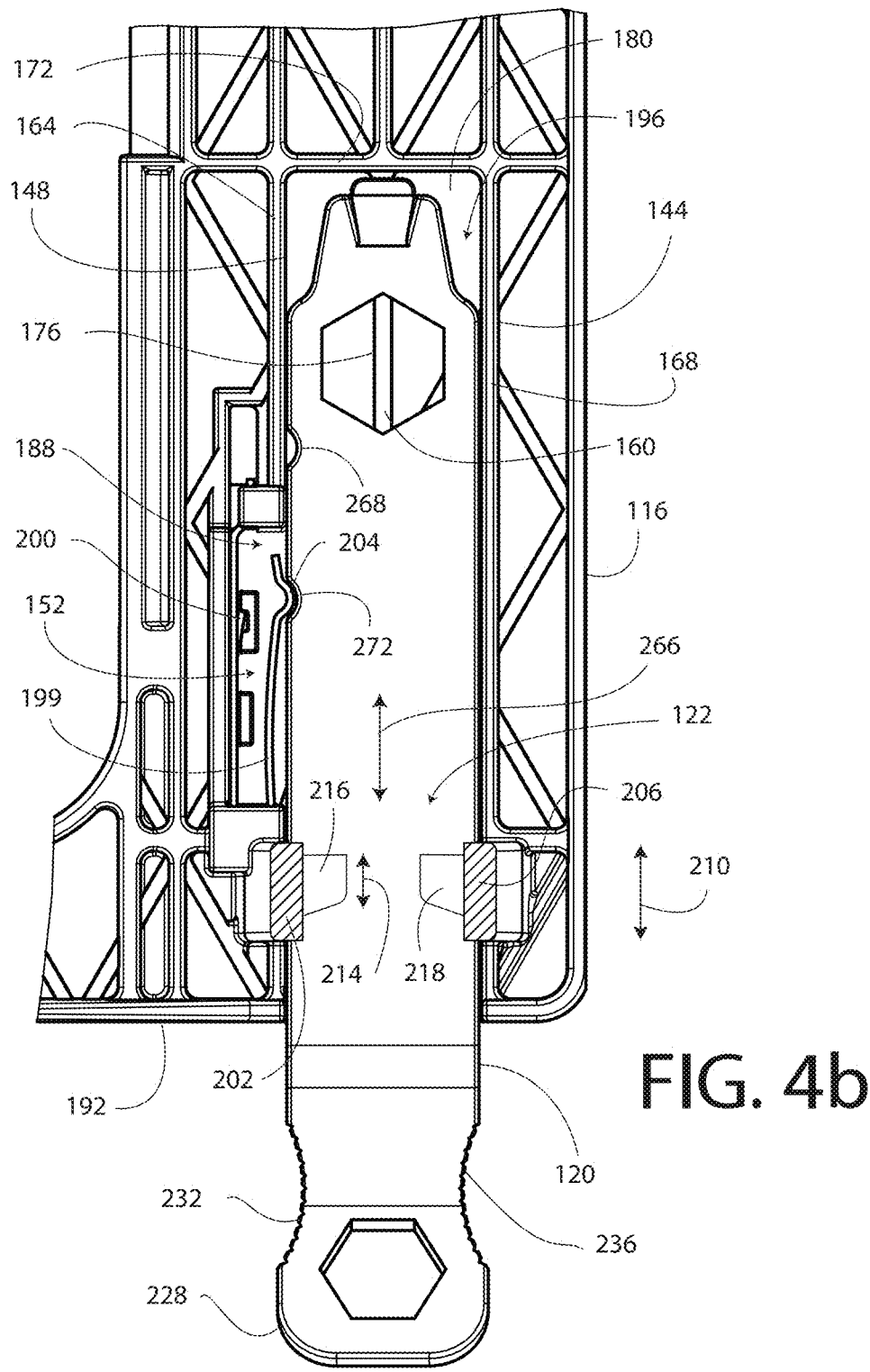
FIG. 4b is a fragmentary top plan view that is similar to FIG. 4a, except that a portion of the bridge structure is not shown in order to illustrate an anti-tilt structure of the foot plate.

The plurality of walls of the guide surface 148 (including the floor 160, the lateral walls 164, 168, and the backstop 172) define a storage space 196 in which the accessory 120 is positionable (as shown in FIGS. 1, 4a, and 4b). The storage space 196 includes the area between the left lateral wall 164 and the right lateral wall 168, and the area between the backstop 172 and the edge 192. The storage space 196 is approximately a cuboid-shaped void having a length extending from the edge 192 to the backstop 172, a width extending from the left lateral wall 164 to the right lateral wall 168, and a height extending perpendicularly from the floor 160 to the top of the lateral walls 164, 168.

As shown in FIG. 2, the detent system 152 is supported by the foot plate 116 and includes a biasing element 199, such as a spring stamping made of the same material as the foot plate. The biasing element 199 includes an anchor 200 and a detent member 204. The anchor 200 is connected to the foot plate 116 and is located outside of the storage space 196.

The detent member 204 is movable between a disengaged position (FIGS. 2 and 3) and an engaged position (FIGS. 4a and 4b). In the disengaged position, the detent member 204 is positioned, at least partially, in the storage space 196. In the engaged position, the detent member 204 is moved away from the right lateral wall 168 against the biasing force of the biasing element 199.

Figure 3:
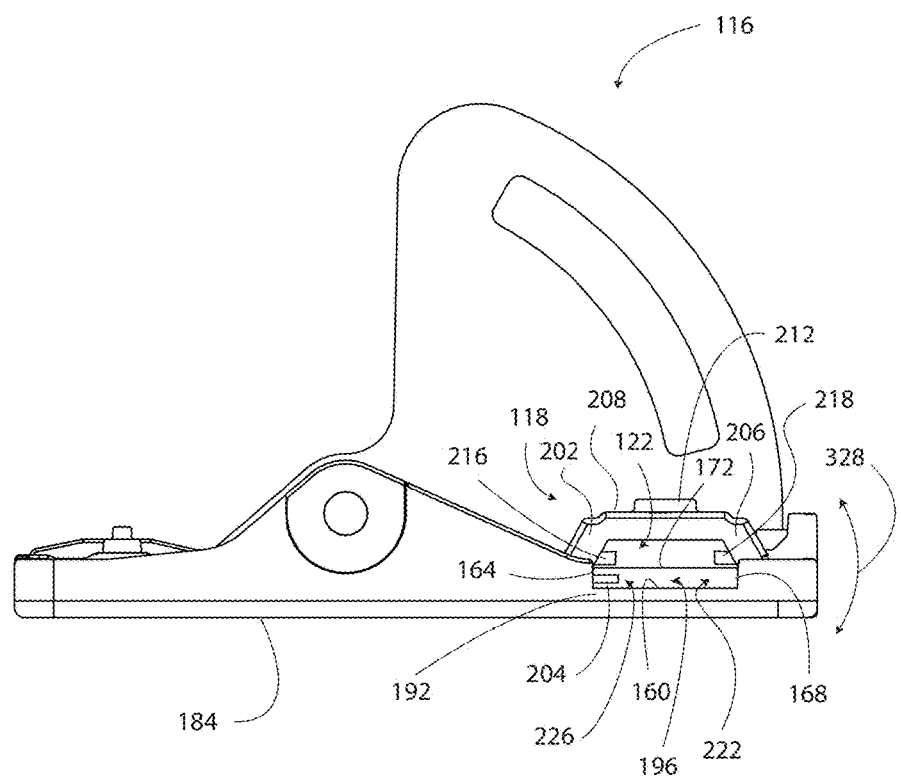
FIG. 3 is a rear elevational view of the foot plate of FIG. 2.

As shown in FIG. 3, the power tool 100 further includes a bridge structure 118 and an anti-tilt structure 122. The bridge structure 118 extends from the left lateral wall 164 to the right lateral wall 168, such that the storage space 196 is interposed between the bridge structure and the foot plate 116. The bridge structure 118 includes a left ramp 202, a right ramp 206, a plateau 208, and an adjustment member 212 (also shown in FIG. 4a).

The left ramp 202 extends from the left lateral wall 164 away from the floor 160. The right ramp 206 extends from the right lateral wall 168 away from the floor 160. The left ramp 202 and the right ramp 206 are spaced apart from the storage space 196. The left ramp 202 and the right ramp 206 are formed from the same material as the foot plate 116.

The plateau 208 is connected between the left lateral wall 164 and the right lateral wall 168. The plateau 208 is spaced apart from the storage space 196. The plateau 208 defines a width 210 (FIG. 4a). The plateau 208 also defines an opening (not shown) for receiving the adjustment member 212.

The adjustment member 212 is positioned in the opening of the plateau 208. The adjustment member 212 is positionable to stabilize the foot plate 116 when the foot plate is moved relative to the housing 108. The adjustment member 212 is prevented from being positioned in the storage space 196, even when the adjustment member is fully inserted into the opening.

As shown in FIGS. 3 and 4b, the anti-tilt structure 122 provides tilt control for the accessory 120, when the accessory is positioned in the storage space 196. The anti-tilt structure 122 is interposed between the bridge structure 118 and the foot plate 116. A portion of the anti-tilt structure 122 extends from the left lateral wall 164 so that the storage space 196 is interposed between the anti-tilt structure and the foot plate 116. The anti-tilt structure 112 possesses a width 214 (FIG. 4b) as measured in the same direction as the width 210 (FIG. 4b) of the bridge structure 118.

The anti-tilt structure 122 includes a left projection 216 and a right projection 218. The left projection 216 extends from the left ramp 202 of the bridge structure 118. The left projection 216 is spaced apart from the storage space 196, such that a sub-space 226 (FIG. 3) of the storage space is defined between the left projection and the foot plate 116.

The right projection 218 extends from the right ramp 206 of the bridge structure 118. The right projection 218 is spaced apart from the storage space 196, such that another sub-space 222 (FIG. 3) of the storage space 196 is defined between the right projection and the foot plate 116. The sub-space 222 is spaced apart from the sub-space 226. The right projection 218 extends for a distance equal to the width 214.

Figure 5:
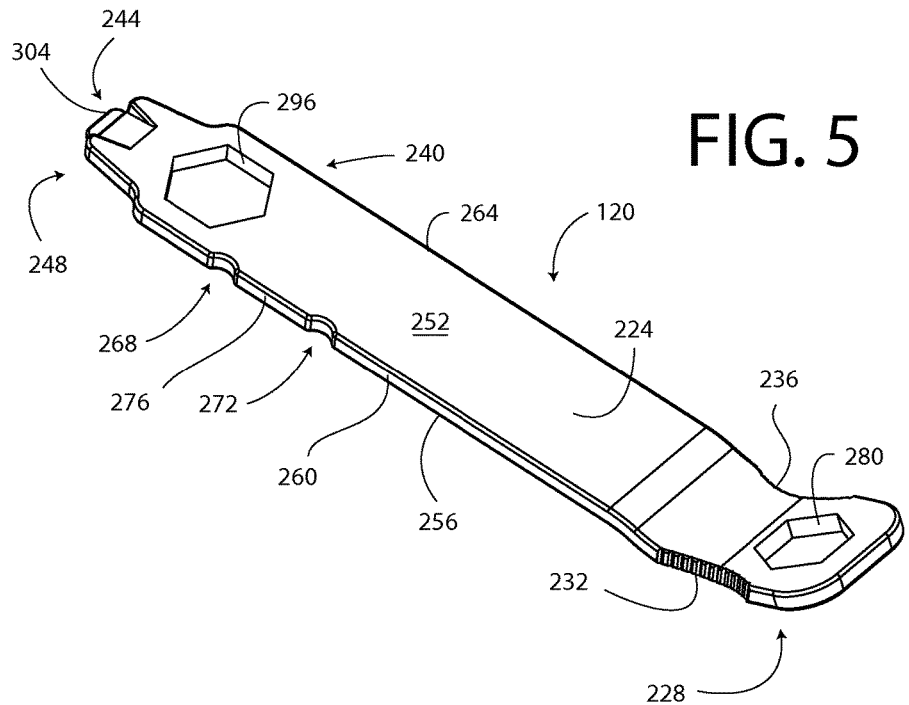
FIG. 5 is a perspective view of the accessory of FIG. 1.
Figure 6:
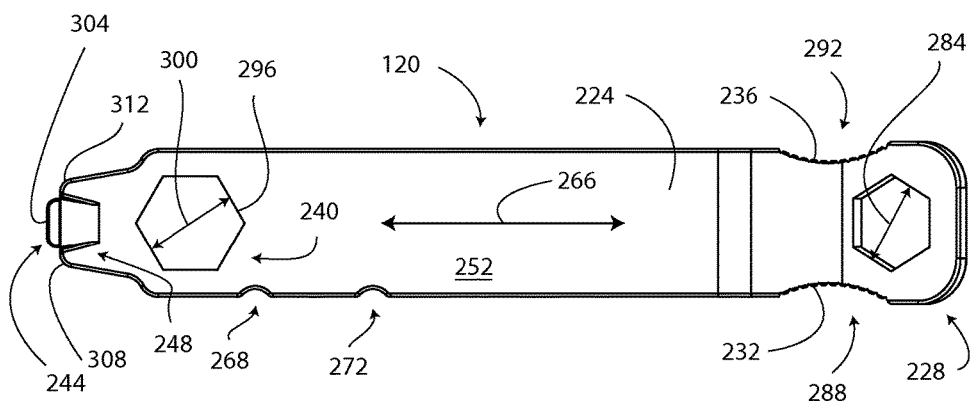
FIG. 6 is a top plan view of the accessory of FIG. 1.
Figure 7:
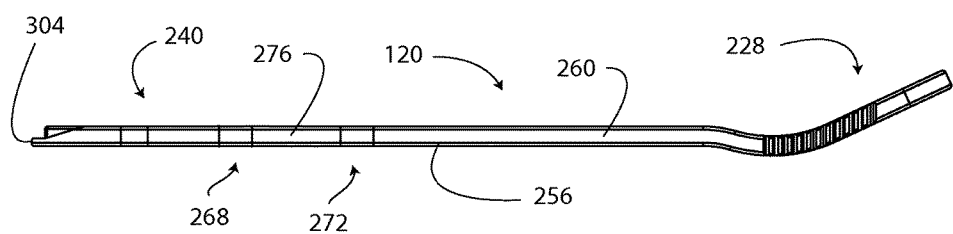
FIG. 7 is a side elevational view of the accessory of FIG. 1.

As shown in FIGS. 5-7, the accessory 120 includes a plate 224, an angled wrench structure 228, a left serrated grip surface 232, a right serrated grip surface 236, a flat wrench structure 240, a screwdriver structure 244, and a knock-out pry structure 248. The plate 224 includes a top plate surface 252, a bottom plate surface 256, a left lateral side 260, and a right lateral side 264.

The plate 224 defines a longitudinal axis 266 (FIG. 6). When the accessory 120 is positioned in the storage space 196, the longitudinal axis 266 defines a direction of extent that is parallel to the longitudinal axis 266 and parallel to the direction of extent of the width 214 of the anti-tilt structure 122. The direction of extent is parallel to the direction in which the width 214 and the width 210 extend.

The top plate surface 252 is located opposite of the bottom plate surface 256. The left lateral side 260 and the right lateral side 264 are interposed between the top plate surface 252 and the bottom plate surface 256 and are located opposite of each other.

The left lateral side 260 defines a primary detent structure 272 (second detent structure) and a secondary detent structure 268 (first detent structure) and includes an intermediate side surface 276. The primary detent structure 272 is shown as a detent recess. The secondary detent structure 268 is also shown as a detent recess. The primary detent structure is spaced apart from the secondary detent structure 268 and is linearly aligned with the secondary detent structure. The intermediate side surface 276 is interposed between the primary detent structure 272 and the secondary detent structure 268. The primary detent structure 272 and the secondary detent structure 268 are configured to receive the detent member 204 therein when the accessory 120 is positioned in the storage space 196 (as shown in FIGS. 4a and 4b). In another embodiment of the accessory 120, the right lateral side 264 defines the primary detent structure 272 and the secondary detent structure 268. In yet another embodiment of the accessory 120, the accessory may define more than two of the detent structures 268, 272 and the detent structures may be formed on both the left lateral side 260 and the right lateral side 264. In still another embodiment of the accessory 120, the accessory may define only one of the detent structures 268, 272, which may be formed on the left lateral side 260 or the right lateral side 264.

With continued reference to FIGS. 5-7, the angled wrench structure 228 extends from the plate 224 and defines a polygonal drive surface 280. The polygonal drive surface 280 extends between the top plate surface 252 and the bottom plate surface 256 and has a dimension 284 (FIG. 6). The polygonal drive surface 280 is used to tighten and loosen a fastener or element having the dimension. Specifically, the polygonal drive surface 280 is sized to fit the arbor 112. In another embodiment, the polygonal drive surface 280 is sized to fit another fastener or element of the power tool 100.

The left serrated grip surface 232 is defined in the left lateral side 260 and extends between the angled wrench structure 228 and the plate 224. The left serrated grip surface 232 defines a concave space 288 (FIG. 6).

The right serrated grip surface 236 is defined in the right lateral side 264 and extends between the angled wrench structure 228 and the plate 224. The right serrated grip surface 236 defines a concave space 292 (FIG. 6).

The flat wrench structure 240 extends from the plate 224 and defines a polygonal drive surface 296. The polygonal drive surface 296 extends between the top plate surface 252 and the bottom plate surface 256 and has a dimension 300 (FIG. 6). The polygonal drive surface 296 is used to tighten and loosen a fastener or element having the dimension 300. The polygonal drive surface 296 is sized to fit an oil fill cap (not shown) of the power tool 100. The dimension 300 is different from the dimension 284 so that the accessory 120 is usable to tighten or loosen two differently sized fasteners. In another embodiment, the polygonal drive surface 296 is sized to fit another fastener or element of the power tool 100.

The screwdriver structure 244 includes a linear drive surface 304. The linear drive surface 304 is configured to drive the brush cap 132. In another embodiment, the linear drive surface 304 is configured to fit another element or member of the power tool 100.

Figure 8:
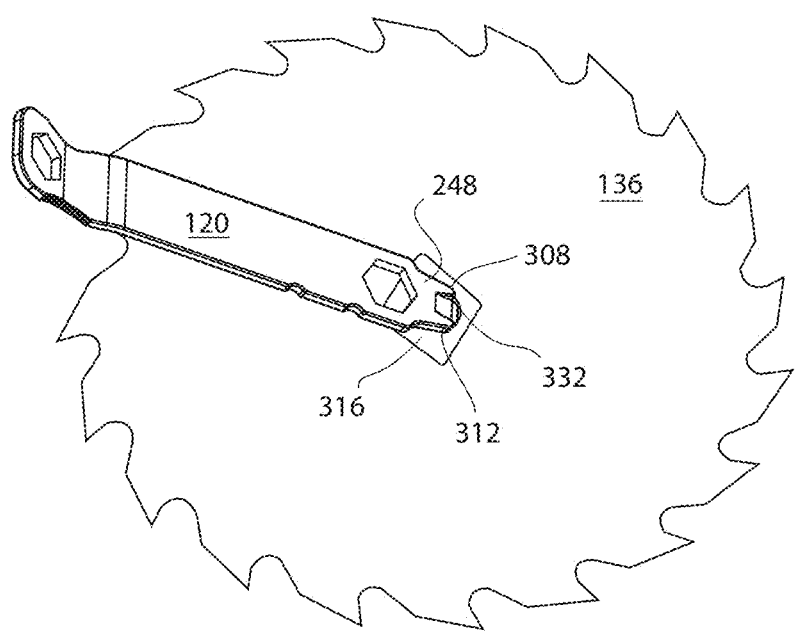
FIG. 8 is a perspective view of the accessory of FIG. 1, shown with the accessory positioned to remove a knock out of a saw blade.

The knock-out pry structure 248 is on the same end of the accessory 120 as the screwdriver structure 244. The knock-out pry structure 248 includes a left stop 308 (FIG. 6) and a right stop 312 (FIG. 6) that are positioned at opposite ends of the linear drive surface 304. As shown in FIG. 8, the knock-out pry structure 248 is configured to remove a knock-out portion 316 from the saw blade 136 to enable to saw blade to be received by the arbor 112.

The accessory 120 is positionable in a use position and in a storage position. In the use position the accessory 120 is spaced part from the foot plate 116 and is available to maintain or adjust the power tool 100.

To move the accessory 120 from the use position to the storage position (FIGS. 4a and 4b), the accessory is positioned so that the screwdriver structure 244 is located at least partially under the plateau 208, between the left lateral wall 164 and the right lateral wall 168. In this position, the accessory 120 is positioned between the floor 160 and the projections 216, 218 with the bottom plate surface 256 against the floor 160. Then the accessory 120 is advanced toward the backstop 172 so that plate 224 passes under the left and right projections 216, 218.

Continued movement of the accessory 120 toward the backstop 172 causes the left lateral side 260 to contact the detent member 204 and to move the detent member away from the storage space 196. In particular, the movement of the accessory 120 causes the left lateral side 260 to move the detent member 204 from the disengaged position (FIGS. 2 and 3) to the engaged detent position (FIGS. 4a and 4b). The resiliency of the biasing element 199 keeps the detent member 204 pressed against the left lateral side 260.

As the accessory 120 is moved farther toward the backstop 172, the secondary detent structure 268 is positioned adjacent to the detent member 204 and the biasing element 199 advances the detent member into the secondary detent structure 268. This position of the accessory 120 is referred to as the secondary storage position. When the detent member 204 is seated in the secondary detent structure 268, the biasing element 199 prevents the accessory 120 from being separated from the foot plate 116 under the weight of the accessory. The biasing element 199 also prevents the accessory 120 from being separated from the foot plate 116 due to vibrations and other forces generated by the power tool 100 when the power tool is being operated and also when the power tool is being transported.

When the accessory 120 is advanced even farther toward the backstop 172, the detent member 204 is advanced out of the secondary detent structure 268 and is biased against the intermediate side surface 276. Continued movement of the accessory 120 enables the biasing element 199 to advance the detent member 204 into the primary detent structure 272. The accessory 120 is in the storage position, when the biasing element 199 advances the detent member 204 into the primary detent structure 272.

In the storage position, the accessory 120 is partially positioned in the storage space 196, and the accessory is interposed between the left lateral wall 164 and the right lateral wall 168. In the storage position, the bottom plate surface 256 is positioned against the floor 160, and the linear drive surface 304 of the screwdriver structure 244 is positioned against or proximal to (i.e. within zero to five millimeters) the backstop 172. The angled wrench portion 228 is spaced apart from the storage space 196 when the accessory 120 is in the storage position.

In the storage position the accessory 120 is prevented from being separated from the foot plate 116 under its own weight. The accessory 120 remains in the storage position even in response to abrupt movements of the power tool 100 by a user. The accessory 120 remains in the storage position in response to vibrations and other forces generated by the power tool 100 as it is being operated. Also, the position of the accessory 120 on the rear side of the foot plate 116 ensures that the accessory is not inadvertently dislodged from the storage position during normal use of the power tool 100. As a result, in the storage position the accessory 120 is available to maintain or adjust the power tool 100 when needed and is prevented from interfering with a user's operation of the power tool.

When the accessory 120 is in the storage position, the anti-tilt structure 122 provides tilt control to the accessory. In the storage position, the accessory 120 is interposed between the anti-tilt structure 122 and the floor 160 of the foot plate 116. Specifically, the left projection 216 is located above the plate 252 on the left side of the longitudinal axis 266 so that the plate is positioned between the left projection and the floor 160. The right projection 218 is located above the plate 252 and on the right side of the longitudinal axis 266 so that the plate is positioned between the right projection and the floor 160.

The anti-tilt structure 122 prevents tilting of the accessory 120 in the directions 324 (FIG. 1) and the directions 328 (FIG. 3). This prevents the accessory 120 from being pivoted downward in the direction 324 to an extent that causes the detent member 204 to advance out of the primary detent structure 272 and become lodged under the plate 224 in a jammed position. It is the width 214 of the left projection 216 and the right projection 218 that enables the anti-tilt structure 122 to prevent movement in the directions 324 of the accessory 120.

The anti-tilt structure 122 prevents the accessory 120 from being rotated in the directions 328 to a point that causes the detent member 204 to advance out of the primary detent structure 272 and to become advanced between the plate 224 and the floor 160 in the jammed position. The anti-tilt structure 122 is independent of the detent system 152, which maintains the accessory 120 within the storage space 196. Accordingly, the tilt control aspect is separate from the accessory retention aspect.

To move the accessory 120 from the storage position to the use position, the user grasps the serrated grip surfaces 232, 236 and pulls the accessory away from the backstop 172. The serrated grip surfaces 232, 236 are typically positioned between the user's thumb and forefinger. The grip provided by the serrated grip surfaces 232, 236 prevent the user's grasp from slipping as the force of the biasing element 199 is overcome during removal of the accessory 120 from the storage space 196.

During movement of the accessory 120 away from the backstop 172, the detent member 204 is advanced out of the primary detent structure 272. Continued movement of the accessory 120 away from the backstop 172 results in the detent member 204 being biased against the intermediate side surface 276. The detent member 204 contacts the intermediate side surface 276 until the accessory 120 is moved to the position (i.e. the secondary storage position) which enables the biasing element 199 to advance the detent member 204 into the secondary detent structure 268.

Additional movement of the accessory 120 away from the backstop 172 causes the detent member 204 to advance out of the secondary detent structure 268. Thereafter, the accessory 120 is moved from under the plateau 208, the left projection 216, and the right projection 218, at which point the accessory is completely removed from the storage space and is in the use position.

As described above, the accessory 120 is positionable in the secondary storage position, in which the detent member 204 is advanced into the secondary detent structure 268. The secondary storage position is a redundant position that prevents inadvertent movement of the accessory 120 to the use position from the storage position. Specifically, if a force causes the accessory 120 to move away from the backstop 172 and causes the detent member 204 to advance out of the primary detent structure 272, then the biasing element 199 advances the detent member 204 into the secondary detent structure 268 to stop the movement of the accessory, thereby preventing the accessory from exiting the storage space 196 as a result of the force.

When the accessory 120 is in the use position the screwdriver structure 244, the flat wrench structure 240, the angled wrench structure 228, and the knock out pry structure 248 are usable to adjust and maintain the power tool 100. The linear drive surface 304 of the screwdriver structure 244 is usable to drive screws and other fasteners. In one particular use, the linear drive surface 304 is used to remove and attach the brush cap 132 (FIG. 1).

The flat wrench structure 240 and the angled wrench structure 228 are used to tighten and loosen fasteners having a hex shaped drive member. In one particular use, the angled wrench structure 228 is used to adjust the arbor 112, and the flat wrench structure 240 is used to adjust an oil fill cap (not shown) of the power tool 100.

As shown in FIG. 8, the knock out pry structure 248 is used to pry the knock out portion 316 from the saw blade 136 to enable the saw blade to function with the arbor 112. To use the knock out pry structure 248, the left stop 308 and right stop 312 are positioned against a rim 332 of an opening (partially obscured by the accessory 120) in the knock out portion 316. Then the accessory 120 is pivoted to pry the knock out portion 316 apart from the saw blade 136.

Figure 9:
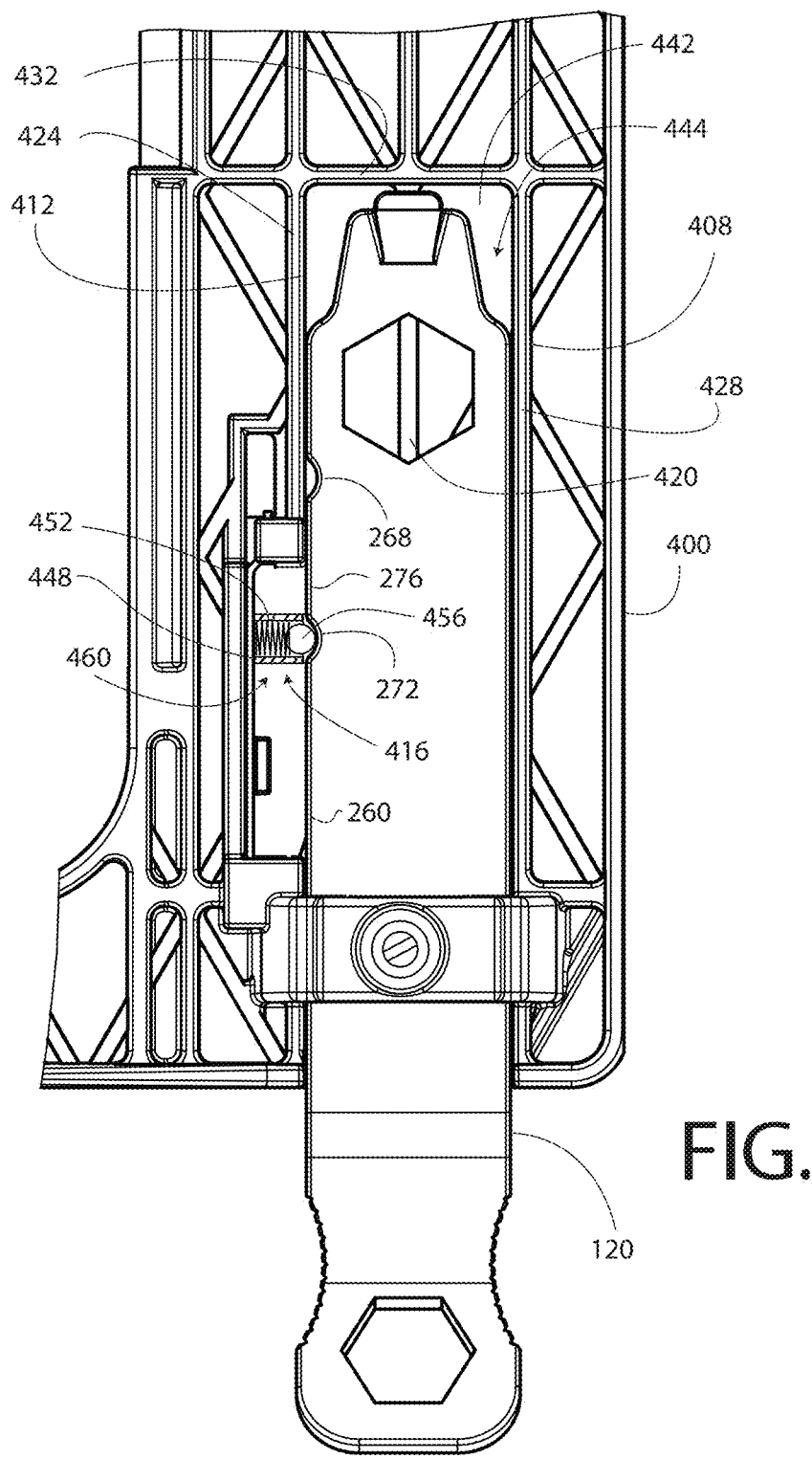
FIG. 9 is a top plan view of the accessory and another embodiment of a foot plate for use with the power tool of FIG. 1, the foot plate includes an alternative embodiment of a detent system.

As shown in FIG. 9, the accessory 120 is secured to another embodiment of a foot plate 400 for use with the power tool 100 of FIG. 1. The foot plate 400 (only a portion of which is shown in FIG. 9) is configured for connection to the housing 108 of the power tool 100. The foot plate 400 is movable relative to the housing 108 to adjust the depth and angle of cut that the saw blade 136 makes in the workpiece. The foot plate 400 is formed from aluminum. In another embodiment, the foot plate 400 is formed from steel or magnesium.

The foot plate 400 includes a storage structure 408. The storage structure 408 includes a guide surface 412 and a detent system 416. The guide surface 412 includes a plurality of walls including a floor 420, a left lateral wall 424, a right lateral wall 428, and a backstop 432. The floor 420 extends from a base 442 of the foot plate 400.

The plurality of walls of the guide surface 412 (including the floor 420, the lateral walls 424, 428, and the backstop 432) define a storage space 444 in which the accessory 120 is positionable (as shown in FIG. 9).

The detent system 416 includes a support structure 448, a biasing member shown as a spring 452, and a roller 456. The support structure 448 extends from the floor 420 and defines a spring space 460.

The spring 452 is at least partially located in the spring space 460 defined by the support structure 448. The spring 452 is a compression spring that exhibits a biasing force when compressed.

The roller 456 is a ball bearing that is also at least partially located in the spring space 448. The roller 456 is positionable in an engaged position (shown in FIG. 9) and a disengaged position (not shown). The spring 452 biases the roller 456 toward the disengaged position. That is, the spring 452 biases the roller 456 toward the right sidewall 428 and toward the accessory 120 (when the accessory is in the storage position). The roller 456 moves toward the engaged position as the left lateral side 260 of the accessory 120 (including the intermediate side surface 276) contacts the roller during movement of the accessory between the use position and the storage position. The sleeve 448 prevents the spring 452 from pushing the roller 456 out of the spring space 448 when the accessory 120 is in the use position.

In operation, the detent system 416 maintains the accessory 120 in the storage position until the accessory is removed from the storage position by a user. When the accessory 120 is positioned in the storage position, the spring 452 biases the roller 456 in the primary detent structure 272. As the user moves the accessory 120 from the storage position to the use position, the roller 456 is advanced out of the primary detent structure 272 and is biased against the intermediate side surface 276. Further movement of the accessory 120 toward the use position aligns the secondary detent structure 268 with the detent system 416, which causes the spring 452 to bias the roller 456 into the secondary detent structure. This position of the accessory 120 is referred to as the secondary storage position. Continued movement of the accessory 120 away from the backstop 432 results in the roller 456 being advanced out of the second detent structure 268 as the accessory is removed from the storage position.

Figure 10:
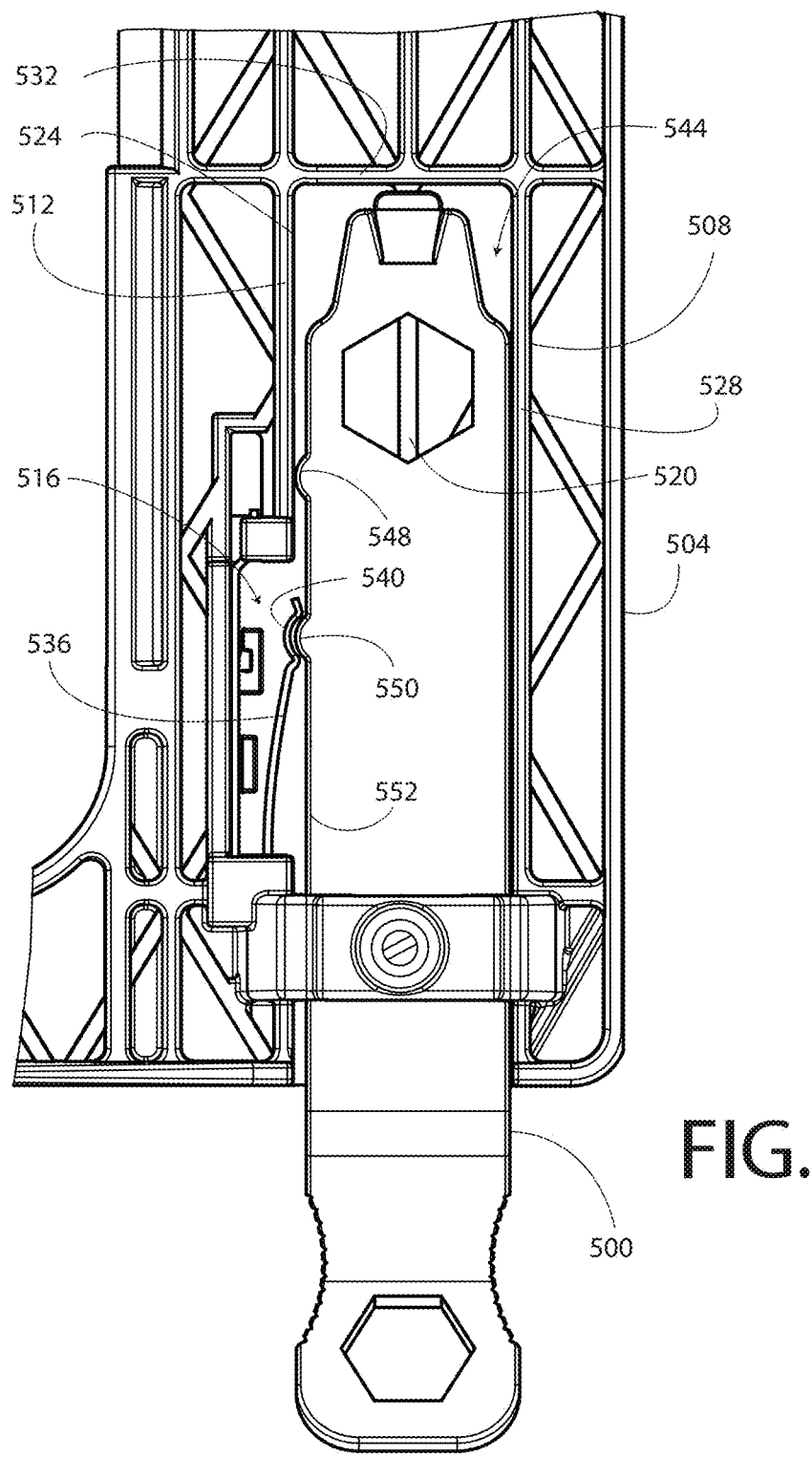
FIG. 10 is a top plan view of yet another embodiment of a foot plate for use with the power tool of FIG. 1, the foot plate includes another alternative embodiment of a detent system, and another embodiment of an accessory is positioned in a storage space of the foot plate.

As shown in FIG. 10, another embodiment of an accessory 500 is secured to another embodiment of a foot plate 504. The foot plate 504 includes a storage structure 508 having a guide surface 512 and a detent system 516.

The guide surface 512 includes a plurality of walls including a floor 520, a left lateral wall 524, a right lateral wall 528, and a backstop 532.

The plurality of walls of the guide surface 512 (including the floor 520, the lateral walls 524, 528, and the backstop 532) define a storage space 544 in which the accessory 500 is positionable (as shown in FIG. 10).

The detent system 516 is supported by the foot plate 504 and includes a biasing element such as a spring 536 stamping made of same material as the foot plate. The spring stamping 536 includes a detent 540, which is movable between a disengaged position (not shown) and an engaged position (FIG. 10). In the engaged position, the detent 540 receives a portion of the accessory 500.

The accessory 500 is substantially identical to the accessory 120, except that the accessory 500 includes a primary detent protrusion 550 instead of the primary detent structure 272 and a secondary detent protrusion 548 instead of the secondary detent structure 268. At least a portion of the protrusions 548, 550 extend beyond a left side surface 552 of the accessory 500.

Figure 11:
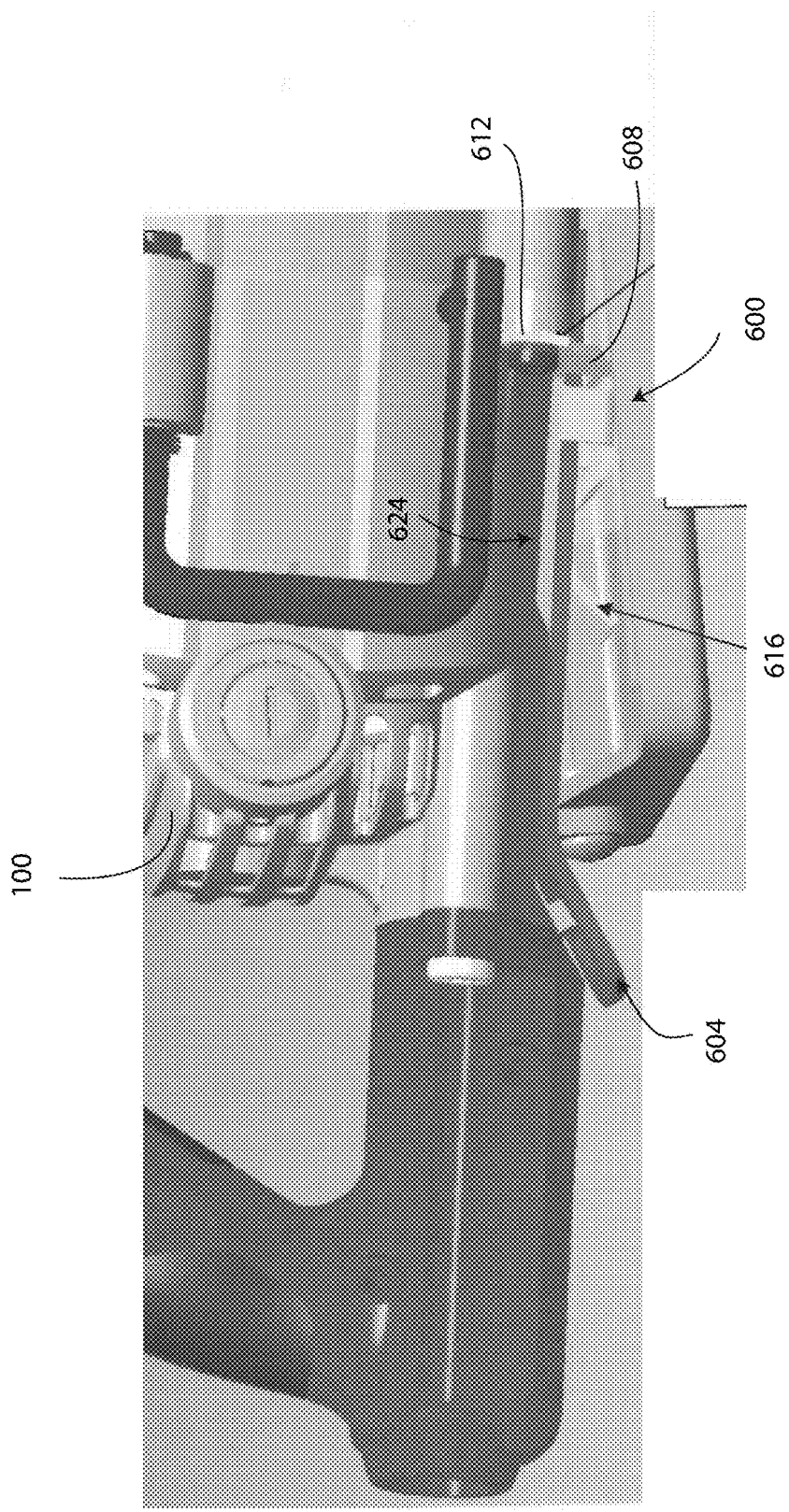
FIG. 11 is a fragmentary perspective view of another embodiment of a power tool and another embodiment of an accessory, the power tool includes another detent system, which receives the accessory.
Figure 12:
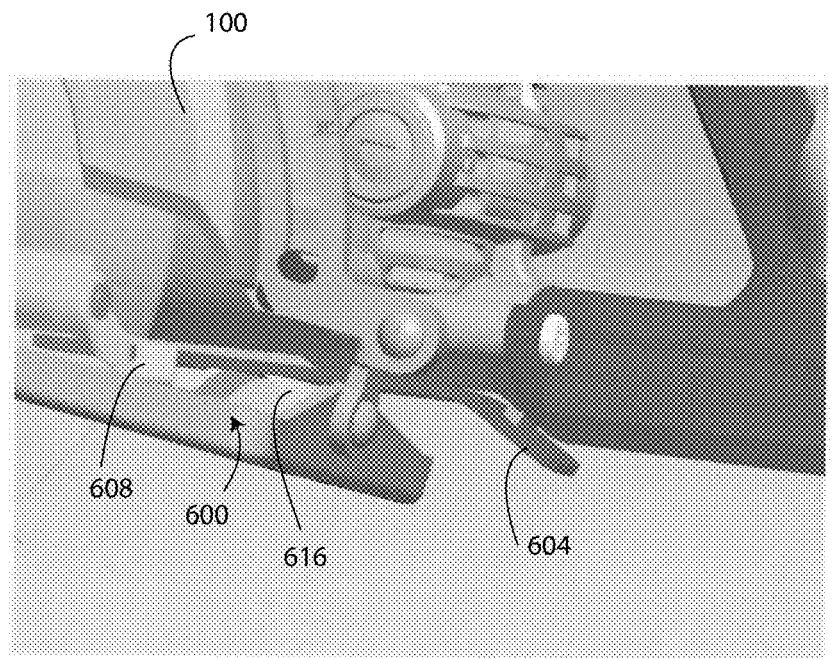
FIG. 12 is a fragmentary perspective view of the power tool and the accessory of FIG. 11.
Figure 13:
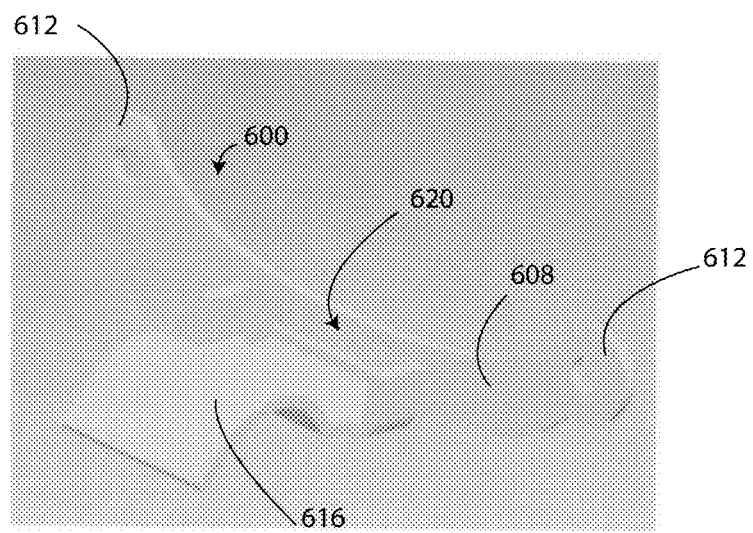
FIG. 13 is a perspective view of a bracket structure of the detent system of FIG. 11.

As shown in FIGS. 11-13, another embodiment of a detent system 600 and an accessory 604 are shown. The detent system 600 includes a bracket structure 608 that is connected to the power tool 100 at two connection tabs 612. The bracket structure 608 includes a detent member 616 and defines an accessory opening 620 (FIG. 13).

The accessory 604 defines an opening 624 (not fully shown), and is configured to pass through the accessory opening 620 during movement of the accessory between the storage and use positions. When the accessory 604 is in the storage position, as shown in FIGS. 11 and 12, the detent member 616 is positioned in the opening 624 in order to secure the accessory to the power tool 100.

Figure 14:
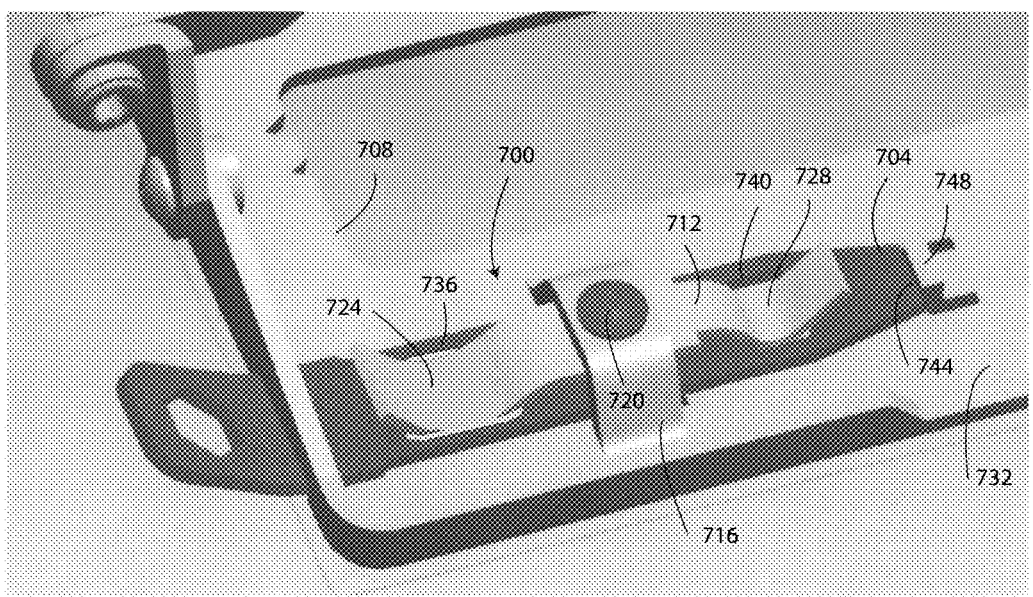
FIG. 14 is a fragmentary perspective view of another embodiment of a foot plate and another embodiment of an accessory.
Figure 15:
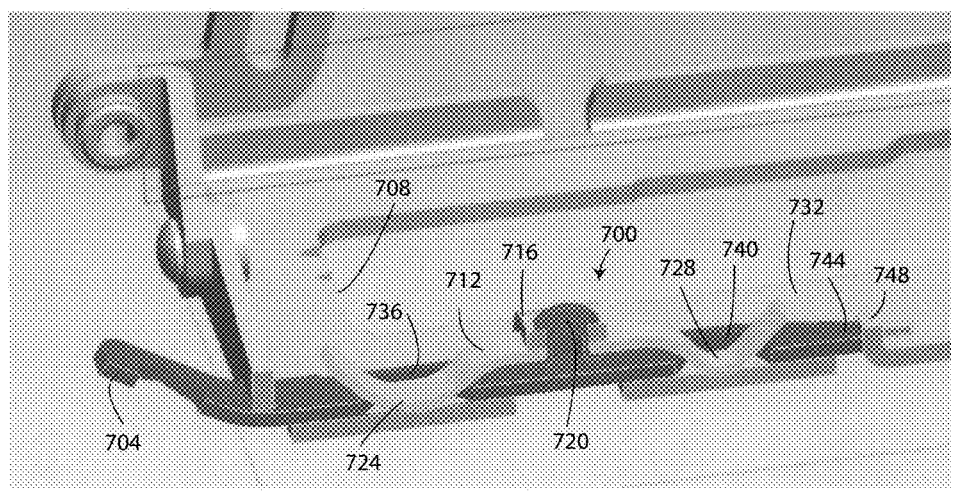
FIG. 15 is a fragmentary perspective view, shown partially in cross section, of the foot plate and the accessory of FIG. 14.

As shown in FIGS. 14 and 15, another embodiment of a detent system 700 secures an accessory 704 to a foot plate 708 of a power tool (not shown). The detent system 700 includes a biasing member 712, which is connected to a bridge 716 of the foot plate 708 with a fastener 720. The biasing member 712 includes a first detent member 724 and a second detent member 728. The biasing member 712 biases the detent members 724, 728 toward a floor 732 of the foot plate 708.

The accessory 704 defines a first opening 736 and a second opening 740. When the accessory 704 is positioned in the storage position the detent member 724 is positioned in the first opening 736 and the detent member 728 is positioned in the second opening 740. Also when the accessory 704 is in the storage position, an end portion 744 of the accessory is positioned against the backstop 748 of the foot plate 708. The accessory 704 is positioned in the secondary storage position when the detent member 728 is positioned in the first opening 736.

Figure 16:
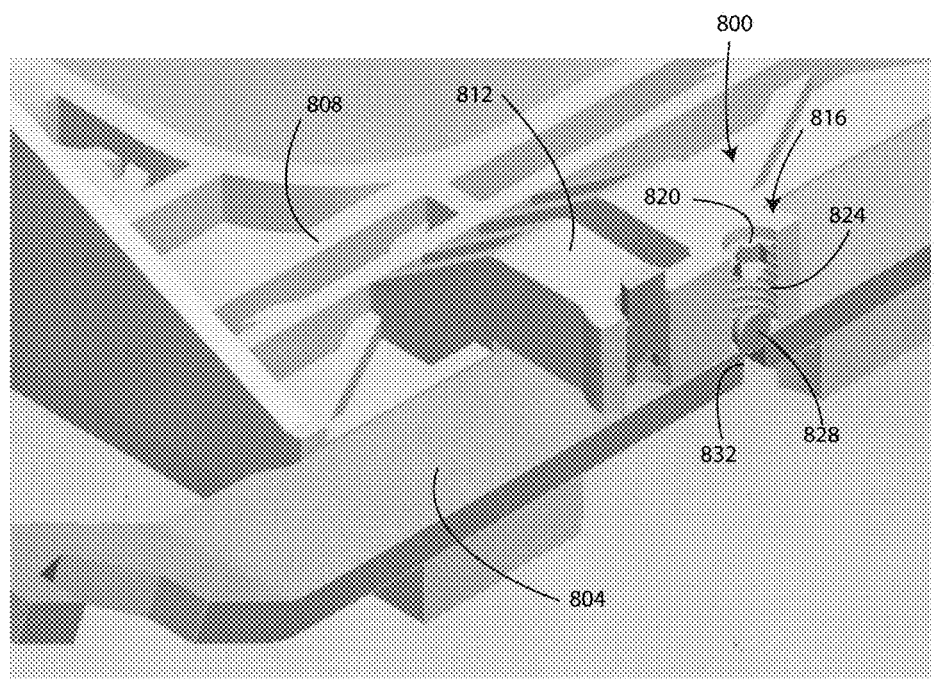
FIG. 16 is a fragmentary perspective view of yet another embodiment of a foot plate and another embodiment of an accessory.

As shown in FIG. 16, another embodiment of a detent system 800 secures an accessory 804 to a foot plate 808 of a power tool (not shown). The detent system 800 is formed on a bridge 812 of the foot plate 808. In particular, the detent system 800 is at least partially positioned within a threaded bore 816 defined in the bridge 812. The threaded bore 816 extends completely through the bridge 812.

The detent system 800 includes a threaded insert 820, a spring 824, and a roller 828, each of which is at least partially positioned in the bore 816. The roller 828 is movable within the bore 816 and is configured to partially extend from the bore. The threaded insert 820 is threaded into the threaded bore 816 and is positioned above the roller 828. The spring 824 is positioned in the threaded bore 816 between the roller 828 and the threaded insert 820. The spring 824 biases the roller 828 away from the threaded insert 820. The threaded insert 820 remains stationary in response to movement of the spring 824 and the roller 828. The force with which the roller 828 is biased is adjustable based on the position of the threaded insert 820 in the bore 816.

When the accessory 804 is positioned in the storage position, the detent system 800 secures the accessory to the foot plate 808 by biasing the roller 828 into a detent recess/opening 832 formed in the accessory. The accessory 804 may include two or linearly aligned detent recesses 832 that are configured to receive the roller 828 in a similar way that the detent member 204 is positioned in one of the detent recesses 268, 272.

Figure 17:
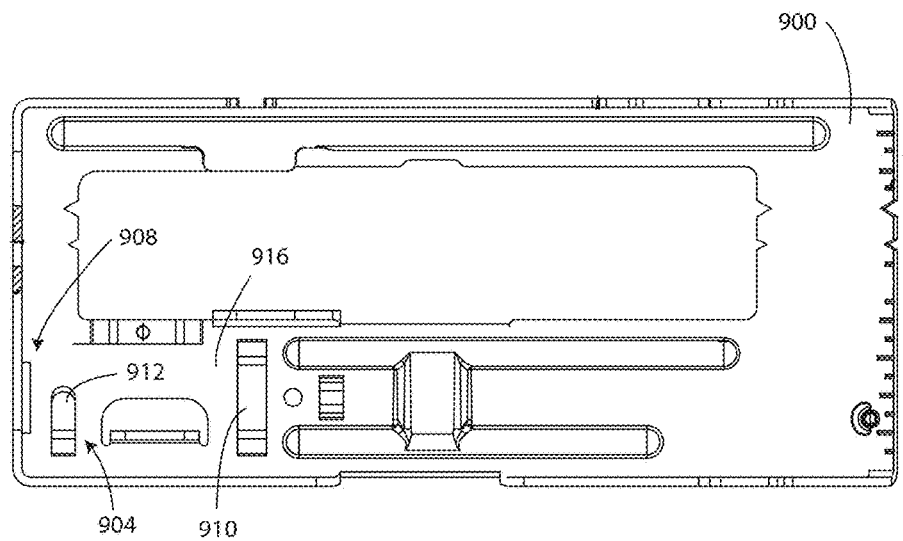
FIG. 17 is a top plan view of still another embodiment of a foot plate for use with the power tool of FIG. 1.
Figure 18:
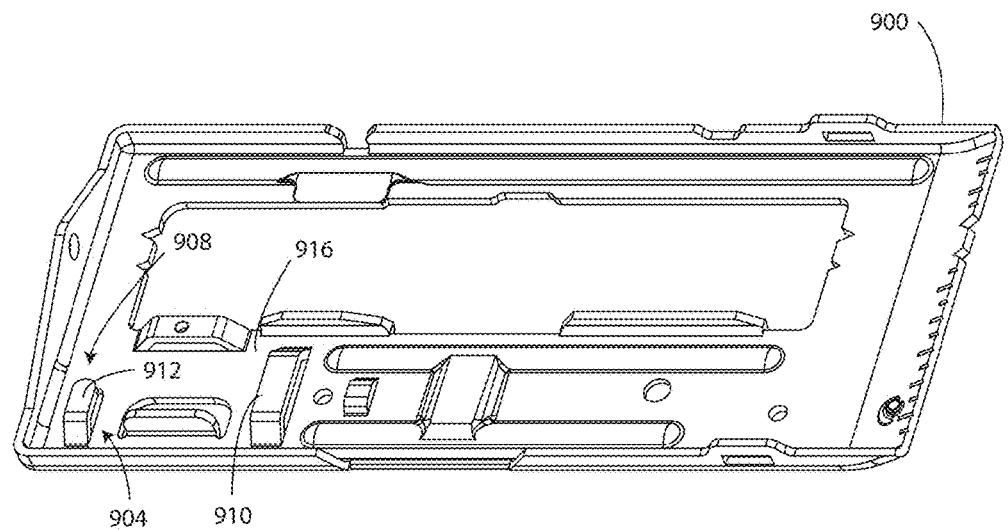
FIG. 18 is a perspective view of the foot plate of FIG. 17.

As shown in FIGS. 17 and 18, another embodiment of a foot plate 900 includes a detent system 904 configured to secure an accessory (not shown) thereto. The foot plate 900 defines an opening 908 through which the accessory extends when the accessory is in the storage position. Additionally, the foot plate 900 includes a bridge 910 under which the accessory is positioned when the accessory is in the storage position.

The detent system 904 includes a detent member 912 that is biased toward a floor 916 of the foot plate 900. When the accessory is in the storage position, the detent member 912 is biased against the accessory to secure the accessory to the foot plate 900. The accessory may include two or more linearly aligned detent recesses (not shown), one of which is positioned to receive the detent member 912 when the accessory is in the storage position.

Although a worm drive circular saw is illustrated, the detent systems, described herein, are configured to function with other types of power tools, including those power tools that have a planar top, such as a table saw. For example, other suitable power tools for use with the detent systems include a table saw, a circular saw, a bandsaw, a dry cutter, a miter saw, a bevel saw, a compound saw, or others.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A power tool, comprising:
   a motor configured to move a saw blade in a repeating pattern of movement;
   a foot plate defining a saw blade opening, said foot plate including a plurality of walls that define a storage space, said plurality of walls including a first lateral wall and an opposite second lateral wall;
   a detent system supported by said foot plate and having a detent member and a biasing element configured to bias said detent member toward said second lateral wall; and
   an accessory defining (i) a first detent structure configured to receive said detent member therein, and (ii) a second detent structure configured to receive said detent member therein,
   wherein said accessory is positionable in (i) a use position in which said accessory is spaced apart from said foot plate, and (ii) a storage position in which said accessory is located in said storage space,
   wherein, during movement of said accessory from said use position to said storage position, said detent member is advanced (i) into said first detent structure, (ii) out of said first detent structure, and then (iii) into said second detent structure, and
   wherein, during movement of said accessory from said storage position to said use position, said detent member is advanced (i) out of said second detent structure, (ii) into said first detent structure, and then (iii) out of said first detent structure,
   wherein said accessory includes a plate having a top plate surface, a bottom plate surface, and a lateral side interposed between said top plate surface and said bottom plate surface,
   wherein said top plate surface, said bottom plate surface, and said lateral side each define said first detent structure and said second detent structure,
   wherein said accessory is interposed between said first lateral wall and said second lateral wall when said accessory is located in said storage position,
   wherein said lateral side is parallel to said first lateral wall and said second lateral wall when said accessory is in said storage position,
   wherein said biasing element is configured to bias said accessory toward said second lateral wall when said accessory is in said storage position,
   wherein said movement of said accessory from said use position to said storage position automatically advances said detent member out of said first detent structure, and
   wherein said movement of said accessory from said storage position to said use position automatically advances said detent member out of said second detent structure and out of said first detent structure.

2. The power tool of claim 1, wherein:
   said first detent structure is a first detent recess, and
   said second detent structure is a second detent recess.

3. The power tool of claim 1, wherein said detent member is located in said second detent structure when said accessory is located in said storage position.

4. The power tool of claim 1, wherein:
   said detent member is movable between a first detent position and a second detent position, and
   movement of said accessory from said use position to said storage position causes said detent member to move from said first detent position to said second detent position.

5. The power tool of claim 4, wherein said accessory is advanced into contact with said detent member when said accessory is advanced from said use position to said storage position.

6. The power tool of claim 1, wherein:
   said first detent structure is a first detent protrusion, and
   said second detent structure is a second detent protrusion.

7. The power tool of claim 1, wherein:
   said lateral side includes an intermediate side surface interposed between said first detent structure and said second detent structure,
   during movement of said accessory from said use position to said storage position, said detent member is advanced into contact with said intermediate side surface after said detent member is advanced out of said first detent structure and before said detent member is advanced into said second detent structure, and
   during movement of said accessory from said storage position to said use position, said detent member is advanced into contact with said intermediate side surface after said detent member is advanced out of said second detent structure and before said detent member is advanced into said first detent structure.

8. The power tool of claim 1, wherein:
   said accessory includes a wrench structure that has (i) a first polygonal drive surface possessing a first dimension, and (ii) a second polygonal drive surface possessing a second dimension, and
   said first dimension is different from said second dimension.

9. The power tool of claim 8, wherein said accessory further includes a screwdriver structure that has a linear drive surface.

10. The power tool of claim 9, wherein said accessory further includes a knock-out pry structure configured to remove a knock-out portion of the saw blade.

11. The power tool of claim 10, wherein said lateral side is a first lateral side and an opposite second lateral side is interposed between said top plate surface and said bottom plate surface, said accessory further including:

a first serrated grip surface defined in said first lateral side of said accessory, said first serrated grip surface defining a first concave space, and a second serrated grip surface defined in said opposite second lateral side of said accessory, said second serrated grip surface defining a second concave space that is spaced apart from said first concave space.

12. The power tool of claim 1, wherein said detent member is one of a spring stamping, a ball, and a roller.

13. A power tool, comprising:
a motor configured to move a saw blade in a repeating pattern of movement;
a foot plate defining a saw blade opening, said foot plate including a plurality of walls that define a storage space, said plurality of walls including a first lateral wall and an opposite second lateral wall;
a detent system supported by said foot plate and having a detent member and a biasing element configured to bias said detent member toward said second lateral wall; and
an accessory defining (i) a first detent recess configured to receive said detent member therein, and (ii) a second detent recess configured to receive said detent member therein, the second detent recess being identical to the first detent recess,
wherein said accessory is positionable in (i) a use position in which said accessory is spaced apart from said foot plate, and (ii) a storage position in which said accessory is located in said storage space,
wherein, during movement of said accessory from said use position to said storage position, said detent member is advanced (i) into said first detent recess, (ii) out of said first detent recess, and then (iii) into said second detent recess,
wherein, during movement of said accessory from said storage position to said use position, said detent member is advanced (i) out of said second detent recess, (ii) into said first detent recess, and then (iii) out of said first detent recess,
wherein said detent member is configured to engage said entire first detent recess when said detent member is advanced into said first detent recess,
wherein said accessory includes a plate having a top plate surface, a bottom plate surface, and a lateral side interposed between said top plate surface and said bottom plate surface,
wherein said detent member is configured to engage said entire second detent recess when said detent member is advanced into said second detent recess,
wherein said accessory is interposed between said first lateral wall and said second lateral wall when said accessory is located in said storage position,
wherein said lateral side is parallel to said first lateral wall and said second lateral wall when said accessory is in said storage position,
wherein said biasing element is configured to bias said accessory toward said second lateral wall when said accessory is in said storage position,
wherein said movement of said accessory from said use position to said storage position automatically advances said detent member out of said first detent recess, and
wherein said movement of said accessory from said storage position to said use position automatically advances said detent member out of said second detent recess and out of said first detent recess.

14. The power tool of claim 13, wherein said detent member is located in said second detent recess when said accessory is located in said storage position.

15. The power tool of claim 13, wherein:
said detent member is movable between a first detent position and a second detent position, and
movement of said accessory from said use position to said storage position causes said detent member to move from said first detent position to said second detent position.

* * * * *